(12) United States Patent
Henderson et al.

(10) Patent No.: US 7,280,134 B1
(45) Date of Patent: Oct. 9, 2007

(54) LANDSCAPE CAMERA SYSTEM WITH ELECTRONIC FIELD OF VIEW SWITCHING

(75) Inventors: Thomas D. Henderson, San Marcos, CA (US); George W. Bates, Canyon Lake, CA (US)

(73) Assignee: Thales Avionics, Inc., Edison, NJ (US)

( * ) Notice: Subject to any disclaimer, the term of this patent is extended or adjusted under 35 U.S.C. 154(b) by 246 days.

(21) Appl. No.: 09/013,645

(22) Filed: Jan. 26, 1998

(51) Int. Cl.
*H04N 7/18* (2006.01)
(52) U.S. Cl. ..................... 348/117; 348/144
(58) Field of Classification Search ............. 348/144, 348/211, 8, 36, 113, 117, 143, 145–147, 159; 345/952; 364/565; 382/284; *H04N 7/18*
See application file for complete search history.

(56) References Cited

U.S. PATENT DOCUMENTS

| | | |
|---|---|---|
| 3,567,163 A | 3/1971 | Kepp et al. |
| 3,668,308 A | 6/1972 | Burt et al. |
| 3,832,046 A | 8/1974 | Mecklenborg |
| 4,045,116 A | 8/1977 | La Russa |
| 4,103,435 A | 8/1978 | Herndon |
| 4,274,609 A | 6/1981 | Ferrier et al. |
| 4,386,848 A | 6/1983 | Clendenin et al. |
| 4,405,941 A | 9/1983 | Mecklenborg |
| 4,442,453 A | 4/1984 | Verdier |
| 4,474,501 A | 10/1984 | LaRussa |
| 4,495,589 A * | 1/1985 | Hirzel .................. 364/565 |
| 4,543,603 A | 9/1985 | Laures |
| 4,697,879 A | 10/1987 | Gerbe |
| 4,805,015 A | 2/1989 | Copeland |
| 4,811,093 A | 3/1989 | Giacometti |
| 4,831,438 A | 5/1989 | Bellman, Jr. et al. |
| 5,005,083 A | 4/1991 | Grage et al. |
| 5,007,736 A | 4/1991 | Daniel et al. |
| 5,027,199 A | 6/1991 | Suzuki |
| 5,077,609 A | 12/1991 | Manelphe |
| 5,130,794 A * | 7/1992 | Ritchey .................. 358/87 |
| 5,166,789 A | 11/1992 | Myrick |
| 5,185,667 A | 2/1993 | Zimmermann |

(Continued)

FOREIGN PATENT DOCUMENTS

DE    297 08 850    9/1997

(Continued)

OTHER PUBLICATIONS

Puritan-Bennett Aero Systems Co., vol. I, Commercial Proposal for Singapore Airlines B-747-400, B-777, & A340 Aircraft Landscape Camera System, Jan. 27, 1997.

(Continued)

*Primary Examiner*—Anand Rao
(74) *Attorney, Agent, or Firm*—Fulwider Patton LLP

(57) ABSTRACT

The improved landscape camera system for use in aircraft utilizes digital video technology to obtain multiple fields of view that are selectable for viewing by passengers on the aircraft, from either a single video frame or from multiple cameras with different fields of view. The camera module can also receive video input from one or more auxiliary video cameras, such as a vertical fin mounted video camera, i.e. directed forward for a view of the aircraft in flight, or a rearward looking belly mounted camera.

5 Claims, 3 Drawing Sheets

U.S. PATENT DOCUMENTS

| | | | | |
|---|---|---|---|---|
| 5,187,571 A | * | 2/1993 | Braun et al. | 358/85 |
| 5,200,818 A | | 4/1993 | Neta et al. | |
| 5,270,756 A | | 12/1993 | Busenberg | |
| 5,286,643 A | * | 2/1994 | Doersen et al. | 348/143 |
| 5,313,306 A | | 5/1994 | Kuban et al. | |
| 5,359,363 A | | 10/1994 | Kuban et al. | |
| 5,384,588 A | | 1/1995 | Martin et al. | |
| 5,440,337 A | * | 8/1995 | Henderson et al. | 348/144 |
| 5,467,271 A | | 11/1995 | Abel et al. | |
| 5,473,364 A | | 12/1995 | Burt | |
| 5,508,734 A | * | 4/1996 | Baker et al. | 348/36 |
| 5,510,830 A | | 4/1996 | Ohia et al. | |
| 5,555,466 A | * | 9/1996 | Scribner et al. | 348/8 |
| 5,574,497 A | | 11/1996 | Henderson et al. | |
| 5,589,901 A | | 12/1996 | Means | |
| 5,596,494 A | | 1/1997 | Kuo | |
| 5,604,534 A | | 2/1997 | Hedges et al. | |
| 5,650,814 A | | 7/1997 | Florent et al. | |
| 5,745,126 A | * | 4/1998 | Jain et al. | 345/952 |
| 5,801,771 A | * | 9/1998 | Ohwaki et al. | 348/211 |
| 5,973,722 A | * | 10/1999 | Wakai et al. | 348/8 |
| 6,128,108 A | * | 10/2000 | Teo | 382/284 |

FOREIGN PATENT DOCUMENTS

| | | |
|---|---|---|
| EP | 0740 177 A2 | 10/1996 |
| FR | 2 768 699 A1 | 3/1999 |

OTHER PUBLICATIONS

Puritan-Bennett Aero Systems Co., vol. II, Technical Proposal for Singapore Airlines B-747-400, B-777, & A340 Aircraft Landscape Camera System, Jan. 27, 1997.

* cited by examiner

FIG. 1a
PRIOR ART
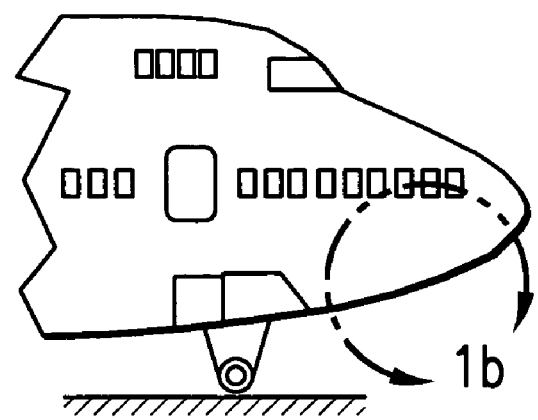
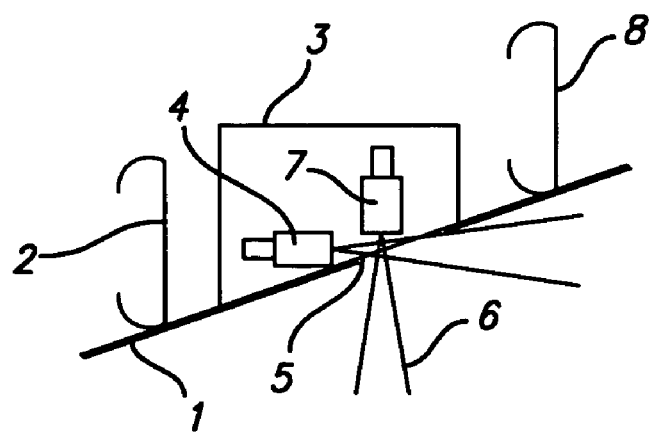
FIG. 1b
PRIOR ART

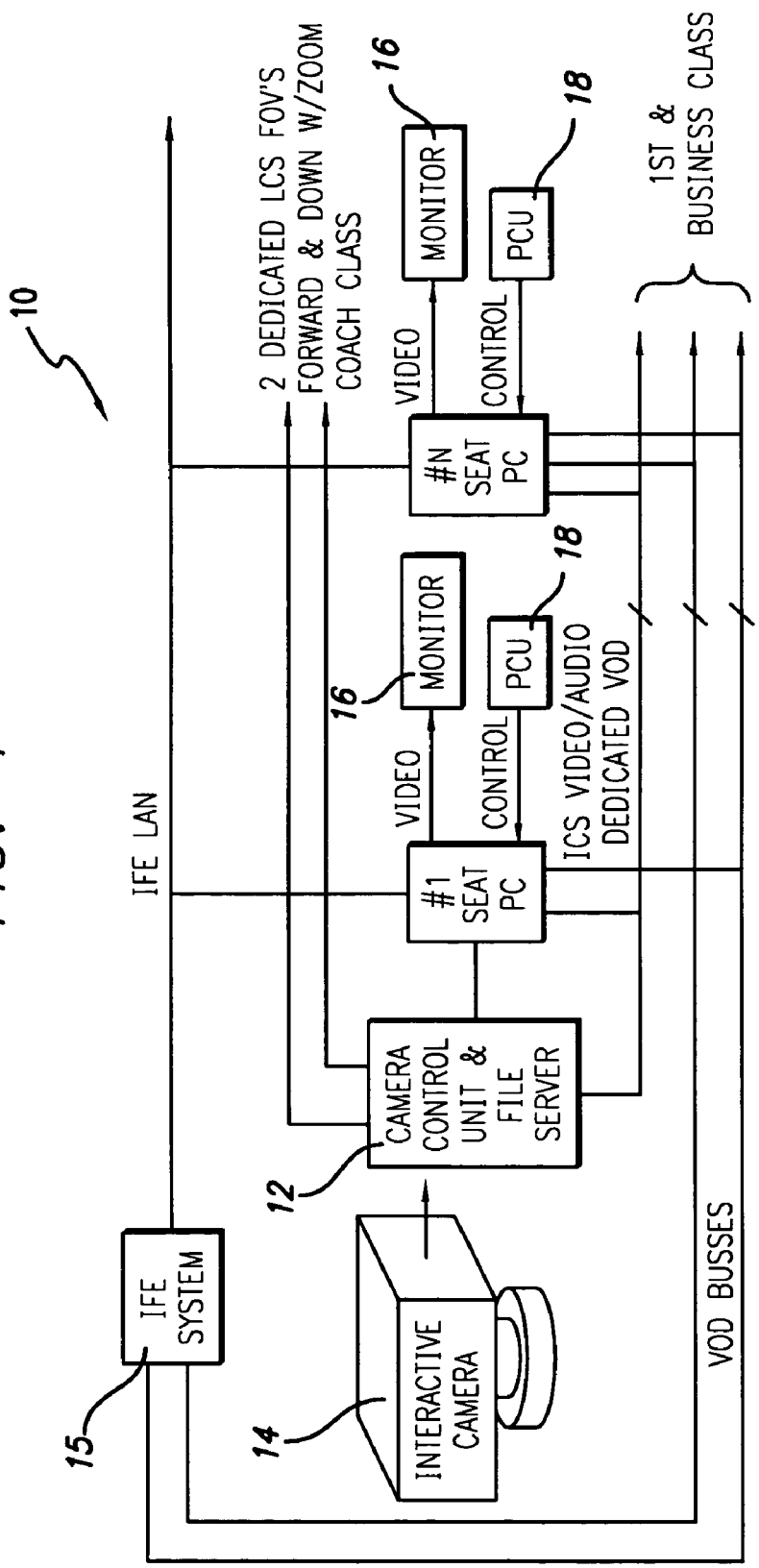

LANDSCAPE CAMERA SYSTEM WITH ELECTRONIC FIELD OF VIEW SWITCHING

BACKGROUND OF THE INVENTION

1. Field of the Invention

This invention relates generally to video camera systems for commercial aircraft, and more particularly relates to a closed circuit television system having one or more cameras providing multiple fields of view exterior to the aircraft to provide video to existing passenger entertainment video systems.

2. Description of Related Art

Commercial airlines now provide in flight entertainment (IFE) systems with video on demand (VOD) and digital audio/video on demand (AVOD), allowing airline passengers to choose a video or audio selection for their in flight entertainment. One video option that can be made available is a view from a video camera of the environment outside the aircraft during flight. One conventional exterior video camera system, for example, provided camera views through a window provided forward of the nose wheel.

A variety of views can also be made available in a closed circuit television from multiple video cameras, as is disclosed in U.S. Pat. No. 5,574,497, which is incorporated by reference in its entirety herein. Two cameras were housed in a single sealed module, with one camera directed approximately forward toward the horizon, and a second camera directed downward, as is illustrated in FIGS. 1a and 1b depicting the general arrangement of camera views in the prior art system. Each camera in this system employed a CCD imager configured as either a camera head unit (CHU) remotely mounted in the aircraft structure, and a companion electronics unit designated as a camera control unit (CCU) located in an electronics and equipment (E&E) bay of the aircraft, or as a single module with the CHU and CCU integrated as a camera module unit (CMU). As is illustrated in FIGS. 1a and 1b, the camera housing unit 3 is structurally integrated into the fuselage skin 1. This structural integration includes an optical grade window 5, and the camera head units 4, 7. The installation area shown is located in a structural bay bounded by frames 2, 8. When the remote mounting of the CCU in the E&E bay is eliminated, cable weight is reduced by over 95%, yielding an overall weight savings in excess of 40 lbs. for a typical B-747-400 aircraft installation.

The fields of view available from such conventional video cameras were interfaced to the onboard video entertainment systems as an analog signal, essentially allowing the passenger to select the fixed fields of view provided by the video cameras mounted on board the aircraft. A typical field of view arrangement available with the prior art dual camera design is shown in FIG. 2. The two fields of view are: 1) Forward Looking, described by angle FBG, and 2) Downward Looking, described by angle HBI. The camera fields of view are aligned along two references; the forward looking camera along a horizontal reference described by line AC, and the downward looking camera long a vertical reference described by line DE, which is perpendicular to the horizontal reference. This optical combination produces an angular field of view range from 7.5° (H) by 5.75° (V) to 3.8° (H) by 2.8° (V). The lens combinations described provide the optical characteristics required in order to minimize the size of the structural window 5, shown in FIG. 1b. However, changing of the fields of view of a video camera such as by panning the camera resulted in a change of the field of view for each passenger viewing the selected camera video view, and individual passenger control for each passenger to select different fields of view was not possible.

It would be desirable to provide a closed circuit television system making multiple fields of view available for selection by passengers on the aircraft, either from a single video frame from a single video camera, or from multiple video cameras providing views individually selectable by passengers on the aircraft. The present invention meets these needs.

SUMMARY OF THE INVENTION

Briefly, and in general terms, the present invention provides for an improved landscape camera system for use in aircraft, that utilizes digital video technology to obtain multiple fields of view that are selectable for viewing by passengers on the aircraft, from either a single video frame or from multiple cameras with different fields of view. In one presently preferred embodiment, the video camera module receives video input from a video camera having a 140° field of view lens that can be rotated 90° about a mounting axis that is perpendicular to a tangent to the surface of the aircraft, providing a maximum angular size of the video frame that is approximately 140° horizontally and 128° vertically, which is 90° from the normal aspect ratio orientation of the lens. The camera module can also receive video input from one or more auxiliary video cameras, such as a vertical fin mounted video camera, i.e. directed forward for a view of the aircraft in flight, or a rearward looking belly mounted camera.

The invention accordingly provides for a closed circuit television system for an aircraft, providing at least one video camera with a field of view forward and downward from the aircraft's centerline, and generating a digital video signal providing a plurality of video images. A video camera control module connected to the at least one video camera and a plurality of video display modules for receiving and displaying the digital video signal provides a plurality of selected video images to the plurality of video display modules, respectively.

In one presently preferred embodiment, a video camera provides a plurality of fields of view from a single video frame. In another preferred embodiment, the plurality of fields can be provided by a plurality of video cameras, such as by providing additional video input from one or more auxiliary video cameras, such as a vertical fin mounted video camera, i.e. directed forward for a view of the aircraft in flight, or a rearward looking, belly mounted camera.

These and other aspects and advantages of the invention will become apparent from the following detailed description and the accompanying drawings, which illustrate by way of example the features of the invention.

BRIEF DESCRIPTION OF THE DRAWINGS

FIG. 1a is an illustration in plan form of the location of prior art exterior view camera systems for aircraft;

FIG. 1b shows a prior art arrangement of dual, forward and downward viewing cameras for aircraft;

FIG. 4 is a schematic diagram of the closed circuit television system for an aircraft of FIG. 3.

DETAILED DESCRIPTION OF THE PREFERRED EMBODIMENTS

While commercial airline in flight entertainment systems with video on demand and digital audio/video on demand, can provide airline passengers with fixed fields of view of the environment outside the aircraft during flight from one or more video cameras mounted on board the aircraft, individual passengers have heretofore been unable to independently select different fields of view of a video camera.

Figure 2:
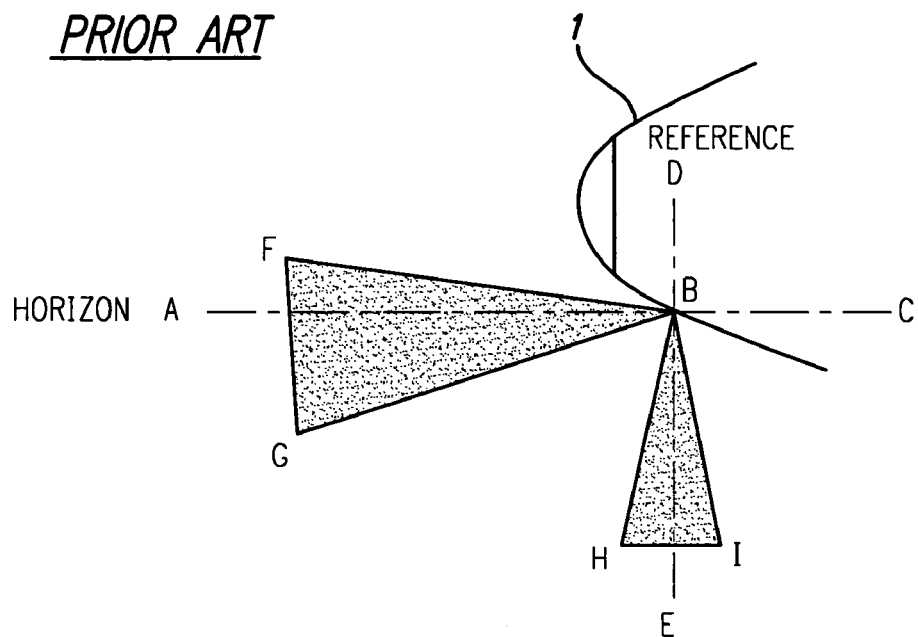
FIG. 2 shows typical prior art fields of view available with a dual camera system.
Figure 3:
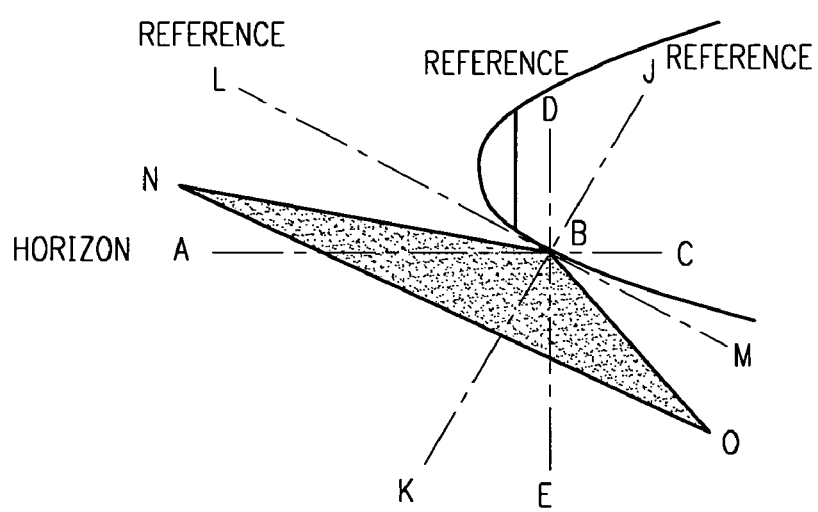
FIG. 3 illustrates a first embodiment of the closed circuit television system for an aircraft of the present invention, showing the range of the multiple fields of view available from a single video camera.

As is illustrated in the drawings, the invention is embodied in an improved landscape camera system for aircraft. The landscape camera system utilizes digital video technology to obtain multiple fields of view that are individually and independently selectable for viewing by passengers on the aircraft, from either a single video frame or from multiple cameras with different fields of view. Referring to FIGS. 3 and 4, in one presently preferred embodiment of a landscape camera system 10, a video camera control unit and file server unit 12 receives video input from a video camera 14 typically having a 140° horizontal by 128° vertical field of view lens that can be rotated 90° about a mounting axis JK that is perpendicular to a tangent LM to the surface of the aircraft, providing a maximum angular size of the video frame that is approximately 140° vertically and 128° horizontally, which is 90° from the normal aspect ratio orientation of the lens. The file server unit 12 houses a remapper board and SEB. The video camera is typically interactive, providing five separate images from five different sensors in the video camera that are stitched together to create an omniview frame by the camera control unit. Referring to FIG. 3, the horizontal and vertical references are the same as those for FIG. 2. However, the new reference line LM and the reference line JK are used for the angular alignment of the landscape camera system. The angle NBO represents the 140° field of view with its center aligned along line JK.

Alternatively, the camera sensor can provide a hemispherical image, with a field of view of 182° in all directions, for example. The field of view results in an image of a minimum of 1° above the horizon in all directions. The hemispherical image, along with any audio component, is distributed to each seat on a dedicated 175 mb bus provided by the AVOD system. The software program required for processing the hemispherical image is downloaded to each seat via the IFE LAN. The IFE LAN also provides any dewarping of the image data and perspective correction to each seat. Utilizing the microprocessing power at each seat provided by the AVOD IFE system allows each passenger to maneuver within this hemispherical image to select any desired field of view, independent of all other passengers. The interactive camera system camera sensor is preferably a 2 million pixel sensor, with matrix filter 59% utilized, with 2,000 horizontal×1,500 vertical active picture elements, providing 1.76 million active pixel elements utilized.

Referring again to FIG. 4, the landscape camera system 10 also includes an in flight entertainment (IFE) system 15 connected to video and audio display units located at each of the passenger seat position (#1 SEAT PC, #N SEAT PC . . . ) by an in flight entertainment local area network (IFE LAN) such as is available from Matsushita or Sony. Each passenger seat video and audio display unit preferably includes a video monitor 16 and a personal control unit (PCU) 18 for operating the interactive camera system video/audio dedicated video on display system. The interactive landscape camera system enables each passenger with in-seat audio/video on demand capability to electronically pan, tilt, and zoom the field of view of the landscape camera system camera independently of all other passengers. The field of view domain is generally from horizon to horizon left and right, as well as forward and aft. Some passenger areas, such as Coach Class for example, may only be provided with dedicated fields of view on dedicated channels. Typically Coach Class seating is provided with only two dedicated landscape camera system fields of view, namely the forward and down views, with an optional zoom. The downward field of view will typically have a zoom capability under either manual control from the cabin crew or from ARINC 628 RS 485 communication from the in flight entertainment system or directly from an ARINC 429 bus. First Class and Business Class additionally can include an interactive camera system that provides a high resolution, real time, full motion television system that provides interactive operation of the camera from a remote location. The VOD busses provide the real time video frames, at a rate of 30 frames pers second (fps) to each seat. Existing airline closed circuit television non-interactive landscape camera systems can typically be accomplished by replacement of the previously installed camera module unit with an interactive camera system camera module, and the addition of an interactive camera system camera control/file server unit. The interactive camera system can be fully interfaced with in flight entertainment video on demand systems, systems providing interactive and passive advertising, interactive systems providing information about tours and points of interest, arrival and destination video, and the like.

Alternatively, the camera module can receive video input from a plurality of high resolution video cameras, in a system that complies with the standards of the proposed ARINC 628 guidelines. The ARINC 628 compliant landscape camera system is currently the preferred baseline configuration for the aircraft closed circuit television landscape camera system according to the invention. The system provides for ARINC 628 compatible control from the in flight entertainment system, or alternatively, discrete control from a dedicated system control unit.

The camera module can also receive video input from one or more auxiliary video camera module units, such as a vertical fin mounted video camera, i.e. directed forward for a view of the aircraft in flight, or a rearward looking belly mounted camera. The vertical fin camera is preferably a fully integrated video camera installed in a sealed housing. The camera utilizes a circular connector for its electrical interface, and requires a 155 volt AC power input, and a synchronization input. The output of the camera is typically a differential composite NTSC 1 V p-p 3.58 MHz video signal. The degree to which the field of view centerline may be adjusted in relation to the horizon is limited due to the aerodynamic design of the housing and its window. This camera typically uses a fixed 3.7 mm lens, but other types of focal length lenses are also available.

The ARINC 628 compliant landscape camera system can also be interfaced with a central video processing unit (CVPU) to provide text and graphics augmentation of video output. The additional CVPU typically provides full ARINC 429 interface capability, text and graphics interface with other information systems, such as the PAX flight information display system (PFIDS), for displaying points of interest, a capability of automatic system disable over sensitive areas, and interactive features described above. The CVPU is typically mounted in the electrical bay of the aircraft, and contains a microprocessor control board, a video I/O board, a system I/O board, a video processor board, a power supply module, and a camera control board. Expansion slots are also available for other boards, and the CVPU is controlled internally by a microprocessor and software.

The CVPU accepts inputs from the video camera units, as well as other information systems available directly to the aircraft in flight entertainment system, such as from individual video switch outputs. These videos also feed an input video switch to provide a fourth output, and the control of the video input switch may also be controlled by aircraft flight phases, as discussed above. Provisions for a moving map display input video are a standard interface for the CVPU as described above. This additional video input is handled within the CVPU as if it were another video camera input. When the moving map video is integrated with the other video camera inputs, the output options to the in flight entertainment system include: 1) the map display may be a part of a sequential display which cycles through a preset order of camera and map video displays; 2) the map display may be integrated into a split display of camera video and map information; 3) the display of map information and video camera views may be combined in various ways for different zone presentations.

An additional feature of this system is the ability to receive text data from moving map systems for integration into the video camera display. Interfaces can include: 1) insert Point of Interest (POI) identifying text into current video camera displays as a label, such as of two lines of text, for example; 2) insert or overlay scrolling POI text into or on current video camera display; 3) utilize the database of the moving map display system as a video camera deactivation signal while overflying sensitive political areas.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In combination, a closed circuit television system mounted to an aircraft for an in flight entertainment system for the aircraft, comprising:

said aircraft having a centerline and a surface and including an in flight entertainment local area network providing audio and video output;

a video camera providing a field of view directed forwardly and downwardly of the aircraft's centerline and a plurality of separate video images, the video camera being mounted to the aircraft and having a wide angle lens with an aspect ratio rotatable 90° about a mounting axis directed forwardly and downwardly of the aircraft's centerline and that is perpendicular to a tangent to the surface of the aircraft to provide said field of view directed forwardly and downwardly of the aircraft's centerline with a view domain from horizon to horizon left to right relative to the aircraft, and forward and aft relative to the aircraft;

a first plurality of video display modules for a corresponding first portion of a plurality of passengers, and a second plurality of video display modules for a corresponding second portion of said plurality of passengers, said first plurality of display modules and said second plurality of display modules being connected to said in flight entertainment local area network;

a video camera control module connected to said video camera for receiving said plurality of separate video images, and connected to said in flight entertainment local area network for providing a forward view image, a downward view image, and an omniview frame image, based upon said plurality of separate video images;

a first plurality of interactive personal control units corresponding to said first portion of said plurality of passengers, said first plurality of interactive personal control units being connected to said in flight entertainment local area network and interfacing between said first portion of said plurality of passengers and said video camera control module, each of said first plurality of interactive personal control units corresponding to respective ones of said first plurality of video display modules and connected to said video camera control module for receiving said forward view image and said downward view image to permit each of said first portion of said plurality of passengers to independently select between said forward view image and said downward view image for each of said first plurality video display modules for said corresponding first portion of said plurality of passengers; and a second plurality of interactive personal control units corresponding to said second portion of said plurality of passengers, said second plurality of interactive personal control units being connected to said in flight entertainment local area network and interfacing between said plurality of passengers and said video camera control module, each of said second plurality of interactive personal control units corresponding to respective ones of said second plurality of video display modules and connected to said video camera control module for receiving said omniview frame image to permit each of said second portion of said plurality of passengers to independently select a desired field of view for each of said second plurality video display modules for said corresponding second portion of said plurality of passengers from said omniview frame image.

2. The combination of claim 1, wherein said wide angle lens comprises a 140° horizontal by 128° vertical field of view lens.

3. In combination, a closed circuit television system mounted to an aircraft for an in flight entertainment system for the aircraft, the aircraft having a first plurality of passenger seat positions and a second plurality of passenger seat positions, comprising:

said aircraft having a surface and a centerline;

a video camera mounted to the aircraft and providing a field of view directed forwardly and downwardly of the aircraft's centerline and a plurality of separate images, the video camera having a landscape camera lens with an aspect ratio rotatable 90° about a mounting axis directed forwardly and downwardly of the aircraft's centerline and that is perpendicular to a tangent to the surface of the aircraft to provide said field of view directed forwardly and downwardly of the aircraft's centerline with a view domain from horizon to horizon left to right relative to the aircraft, and forward and aft relative to the aircraft;

a video camera control unit connected to said video camera for receiving said plurality of separate images, providing a forward view image and a downward view image from said plurality of separate images, and combining said plurality of separate images in an omniview frame image;

an in flight entertainment local area network connected to said video camera control unit for receiving said forward view image, said downward view image, and said omniview frame image, said in flight entertainment local area network providing audio and video output;

a first plurality of interactive video and audio display units connected to said in flight entertainment local area network for receiving said forward view image and said downward view image, each of said first plurality of interactive video and audio display units being located at said first plurality of passenger seat positions, respectively;

a first plurality of video monitors connected to said first plurality of interactive video and audio display units, respectively;

a first plurality of personal control units connected to said first plurality of interactive video and audio display units, respectively, each of said first plurality of personal control units controlling selection between said forward view image and said downward view image for each of the first plurality of interactive video and display units independently of each of the other of said first plurality of interactive video and display units;

a second plurality of interactive video and audio display units connected to said in flight entertainment local area network for receiving said omniview frame image and said audio and video output, each of said second plurality of video and audio display units being located at said second plurality of passenger seat positions, respectively;

a second plurality of video monitors connected to said second plurality of interactive video and audio display units, respectively;

a second plurality of personal control units connected to said second plurality of interactive video and audio display units, respectively, each of said second plurality of personal control units controlling selection of a desired field of view of a corresponding one of said plurality of second video monitors to electronically pan, tilt and zoom the desired field of view from said omniview frame image for each of the second plurality of interactive video and display units independently of each of the other of said second plurality of interactive video and display units, and said second plurality of personal control units being operatively connected to said video camera to control interactive operation of said video camera.

4. The combination of claim 3, wherein said video camera comprises a plurality of sensors providing said plurality of separate images, respectively.

5. The combination of claim 1, wherein said second plurality of personal control units are operatively connected to said video camera to control interactive operation of said video camera.

* * * * *